(12) United States Patent
Lee

(10) Patent No.: US 7,787,606 B2
(45) Date of Patent: Aug. 31, 2010

(54) COMMUNICATION TERMINAL AND RECEPTION BLOCKING METHOD THEREOF

(75) Inventor: Dong Hyun Lee, Seoul (KR)

(73) Assignee: LG Electronics Inc., Seoul (KR)

(*) Notice: Subject to any disclaimer, the term of this patent is extended or adjusted under 35 U.S.C. 154(b) by 729 days.

(21) Appl. No.: 11/488,592

(22) Filed: Jul. 19, 2006

(65) Prior Publication Data

US 2007/0019235 A1   Jan. 25, 2007

(30) Foreign Application Priority Data

Jul. 19, 2005   (KR) .................. 10-2005-0065408

(51) Int. Cl.
*H04M 3/42*   (2006.01)
*H04M 1/64*   (2006.01)

(52) U.S. Cl. ................... 379/210.02; 379/70

(58) Field of Classification Search ................
379/112.02–112.04, 142.02–142.03, 210.02; 358/440
See application file for complete search history.

(56) References Cited

U.S. PATENT DOCUMENTS

| | | | |
|---|---|---|---|
| 6,400,962 B1* | 6/2002 | Yamada | 455/552.1 |
| 6,466,648 B1* | 10/2002 | Ikeno et al. | 379/9 |
| 6,697,479 B1* | 2/2004 | Barnes et al. | 379/215.01 |
| 6,993,362 B1* | 1/2006 | Aberg | 455/566 |
| 7,233,656 B2* | 6/2007 | Bedingfield, Sr. | 379/210.02 |
| 7,295,660 B1* | 11/2007 | Higginbotham et al. | 379/196 |
| 2003/0048889 A1* | 3/2003 | Marchead et al. | 379/114.14 |
| 2004/0213396 A1* | 10/2004 | MacNamara et al. | 379/210.02 |
| 2005/0256796 A1* | 11/2005 | Haga et al. | 705/37 |
| 2006/0147014 A1* | 7/2006 | Smith et al. | 379/210.02 |
| 2006/0182029 A1* | 8/2006 | Kealy et al. | 370/230 |
| 2008/0194241 A1* | 8/2008 | Kretz | 455/417 |

FOREIGN PATENT DOCUMENTS

| | | |
|---|---|---|
| CN | 1469603 A | 1/2004 |
| KR | 10-2002-0085621 A | 11/2002 |
| KR | 10-2003-0028181 A | 4/2003 |
| KR | 10-2003-0040949 A | 5/2003 |
| KR | 10-2003-0086548 A | 11/2003 |
| KR | 10-2004-0020308 A | 3/2004 |
| KR | 10-2004-0060457 A | 7/2004 |
| KR | 10-2006-0002649 A | 1/2006 |

\* cited by examiner

*Primary Examiner*—Fan Tsang
*Assistant Examiner*—Solomon Bezuayehu
(74) *Attorney, Agent, or Firm*—Birch, Stewart, Kolasch & Birch, LLP

(57) ABSTRACT

A communication terminal and reception blocking method thereof are disclosed, by which a signal of a sender having poor credibility can be blocked in advance, by which a plurality of recipients are able to rate a credibility of a specific sender to block a signal of the specific sender and by which information for the rating can be shared. The present invention includes the steps of setting a level of a reception blocking for a signal transmitted from a specific sender identification number, receiving credibility rating information for the specific sender identification number, and if a credibility rating of the specific sender identification number based on the credibility rating information belongs to a range of the set level, deciding the reception blocking for the signal transmitted from the specific sender identification number.

10 Claims, 5 Drawing Sheets

COMMUNICATION TERMINAL AND RECEPTION BLOCKING METHOD THEREOF

This application claims the benefit of the Korean Patent Application No. 10-2005-0065408, filed on Jul. 19, 2005, which is hereby incorporated by reference as if fully set forth herein.

BACKGROUND OF THE INVENTION

1. Field of the Invention

The present invention relates to a reception blocking in a communication system, and more particularly, to a communication terminal and reception blocking method thereof. Although the present invention is suitable for a wide scope of applications, it is particularly suitable for blocking signals from a specific sender.

2. Discussion of the Related Art

Generally, the evolution of communication technology and the generalization of communication terminals lead to the developments of various communication services.

The communication services have evolved to a short message service for sending a short-length sentence from a voice communication oriented service.

The developments of the communication services considerably have contributed to the enhancement of user's convenience.

Yet, the rapid increases of users and advertisements via communication networks occasionally need excessive calls and message/e-mail receptions and the like.

Heretofore, in order to overcome the inconvenience, a method of blocking a signal transmitted from a specific sender has been adopted. In particular, a method of blocking a reception for a telephone number has been used.

However, it is unable to substantially solve the conventional problems using the above blocking methods.

SUMMARY OF THE INVENTION

Accordingly, the present invention is directed to a communication terminal and reception blocking method thereof that substantially obviate one or more problems due to limitations and disadvantages of the related art.

An object of the present invention is to provide a communication terminal and reception blocking method thereof, by which a signal from a sender having poor credibility can be blocked in advance.

Another object of the present invention is to provide a communication terminal and reception blocking method thereof, by which a plurality of recipients rate a credibility of a specific sender when they receive a signal from the specific sender and the credibility rating can be shared.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of blocking a reception in a communication terminal according to the present invention includes the steps of setting a level of a reception blocking for a signal transmitted from a specific sender identification number, receiving credibility rating information for the specific sender identification number, and if a credibility rating of the specific sender identification number based on the credibility rating information belongs to a range of the set level, deciding the reception blocking for the signal transmitted from the specific sender identification number.

Preferably, the signal includes one selected from the group consisting of an e-mail, a short message, a voice communication signal and a video communication signal.

Preferably, the sender identification number includes either an e-mail address or a sender phone number.

Preferably, the credibility rating information is a count that a plurality of communication terminals including the communication terminal rate the sender identification number as bad or good.

More preferably, a plurality of communication terminals limit a rating count for the sender identification number. More preferably, the rating count for the sender identification number is limited to one time.

Preferably, the credibility rating information is a number of communication terminals that rate the signal received from the sender identification number as bad among a plurality of communication terminals including the communication terminal.

Preferably, the level is a value that determines a level of the credibility rating for the sender identification number.

Preferably, if the signal transmitted from the sender identification number is already received, the corresponding signal is stored in a specific memory area together with signals of other sender identification numbers of which reception blocking is decided.

Preferably, if the signal transmitted from the sender identification number is already received, the corresponding signal is deleted and a reception log for the corresponding signal is stored.

In another aspect of the present invention, in a reception blocking in a server providing a communication service to a plurality of communication terminals, a method of blocking a reception includes the steps of collecting information for rating credibility of a specific sender identification number from a plurality of the communication terminals, deciding a credibility rating score of the sender identification number from the information, and transmitting the credibility rating score to one of a plurality of the communication terminals.

Preferably, the communication service includes one selected from the group consisting of an e-mail service, a short message service, a voice communication signal and a video communication signal.

More preferably, the sender identification number includes an e-mail address for the e-mail service.

More preferably, the sender identification number includes a sender phone number for the short message service, the voice communication service or the video communication service.

Preferably, the credibility rating score is a count that a plurality of the communication terminals rate a signal received from the sender identification number as bad or good.

Preferably, the information is collected from a plurality of the communication terminals as many as a determined count.

Preferably, the information is collected from each of a plurality of the communication terminals once.

Preferably, the credibility rating score is a total of credibility ratings for the sender identification number based on the collected information.

Preferably, the credibility rating score is a value resulting from dividing a total of credibility ratings for the sender identification number based on the collected information by a number of the communication terminals having provided the information.

Preferably, if there is a transmission of a specific signal to the corresponding communication terminal to which the credibility rating score will be transmitted, the credibility rating score is transmitted to the corresponding communication terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, in the present invention, a signal transmitted from a specific identification number is blocked through interoperations between a server and communication terminals.

A server provides various communication services to a plurality of communication terminals. For instance, the server offers such a communication service as a short message service, a voice communication service, a video communication service, an e-mail service and the like.

The server relays signals according to the above-numerated services between communication terminals. An object of the present invention is to block the relayed signals in advance or process the relayed signals to block appropriately. And, the signals may correspond to at least one of a short message, a voice communication signal, a video communication signal and an e-mail.

For a signal blocking, a signal of a sender is identified with an identification number of the sender.

The sender identification number may include a phone number given to a sender for a short message service, a voice communication service and a video communication service. In particular, the sender identification number includes numbers given to identify a sender terminal as well as the phone number given to a sender.

The sender identification number may include an e-mail address for an e-mail service. In particular, the sender identification number includes an Internet protocol (IP) address given to identify a sender terminal or universal resource locations (URLs) as well as an e-mail address. In the following description, the various identification numbers are representatively called a sender identification number.

A configuration of a communication terminal for a reception blocking and its operations are explained in detail based on the above-explained contents as follows. And, various procedures for a reception blocking in the communication terminal or server are explained in detail as well.

Figure 1:
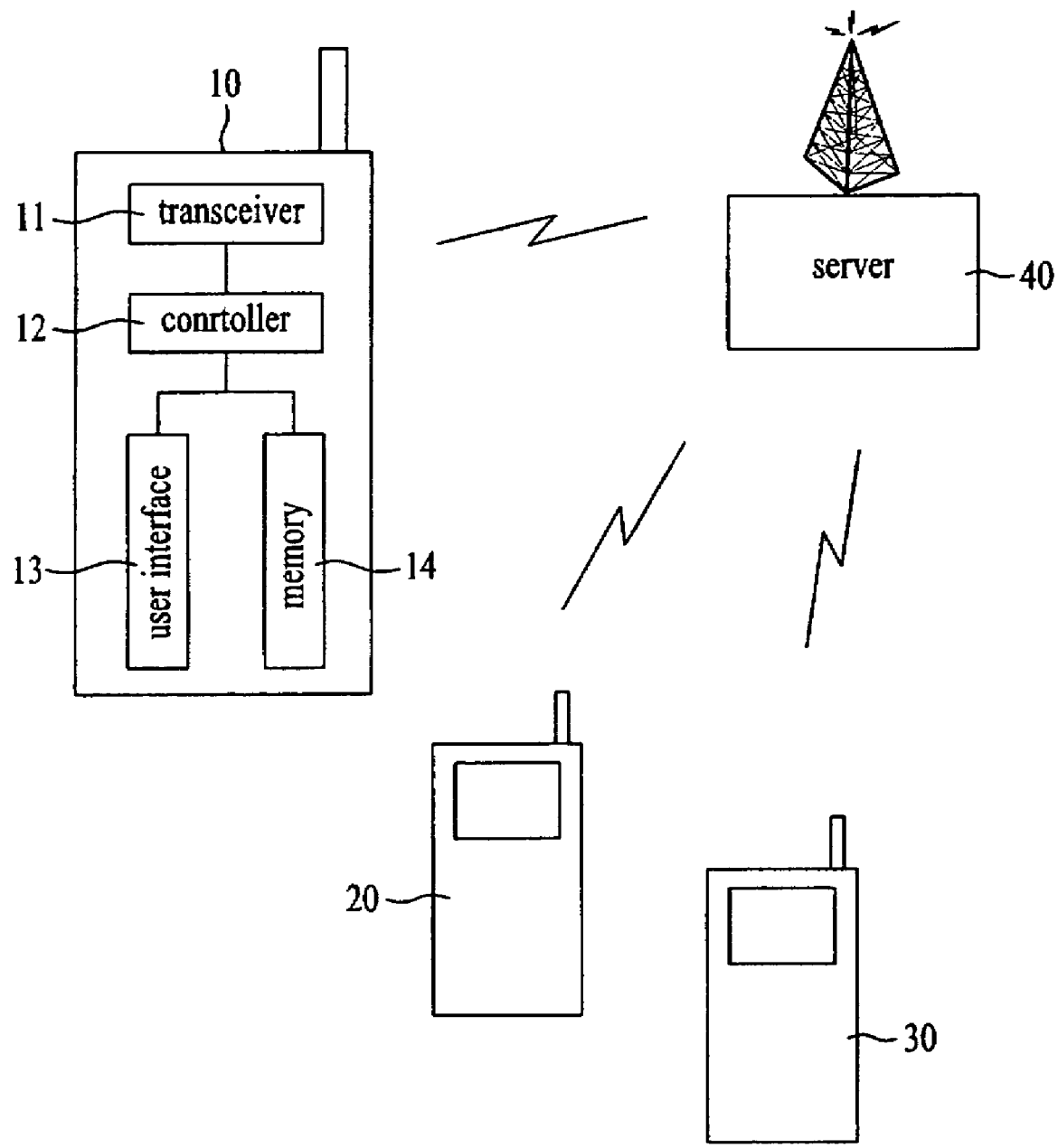
FIG. 1 is a configuration of a communication terminal for a reception blocking according to one embodiment of the present invention.

In the following description, explained are one case that a communication terminal collects data, which are used in deciding whether to block signals of a plurality of sender identification numbers, i.e., credibility rating data for a plurality of sender identification numbers to build a database and the other case that a server collects credibility rating data provided by a plurality of communication terminals to build a database. FIG. 1 relates to the former case and FIGS. 2 to 5 relate to the latter case.

FIG. 1 is a block diagram of a configuration of a communication terminal for a reception blocking according to one embodiment of the present invention.

Referring to FIG. 1, a communication terminal 10 according to the present invention includes a part for rating a sender, a part for collecting rating scores of the sender and a part for blocking a signal of the sender.

In particular, the communication terminal 10 according to the present invention includes a transceiver 11, a controller 12, a user interface 13 and a memory 14.

The transceiver 11 receives signals from a plurality of senders including other communication terminals 20 and 30. In particular, the transceiver 11 analyzes a reception signal to confirm a sender identification number.

A server 40 is responsible for a signal transmission between the communication terminal 10 and the sender 20 or 30.

The communication terminal 10 rates the sender in a following manner.

First of all, the controller 12 checks whether a signal of a sender identification number received via the transceiver 11 is a target to rate credibility. In particular, the controller 12 checks whether the received signal is a sender signal of which credibility was previously rated.

If the received signal is the target to rate the credibility, the controller 13 asks to rate the credibility of the sender via the user interface 13. And, the controller 12 receives the credibility rating information from a user via the user interface 13.

For instance, the user interface 13 displays an input window to input a credibility rating score for the sender identification number based on the signal received from the sender.

For another instance, the user interface 13 displays an input window to input 'goodness' or 'badness' for the sender identification number instead of inputting a detailed credibility rating score for the sender identification number. So, the 'goodness' or 'badness' for the signal of the sender identification number is inputted to the controller 12 via the user interface 13.

After having confirmed contents of a short message or an e-mail, the controller 12 inquires about a credibility rating for the sender having sent the corresponding short message or the corresponding e-mail.

After having finished voice or video communications, the controller 12 inquires about a credibility rating for a correspondent side of the corresponding voice or video communications.

In particular, when the voice communications are terminated, the controller 12 displays a sentence for querying whether to rate a credibility for a correspondent side phone number of the voice communications via the user interface 13. If a user makes an affirmative response to the query, the controller 12 displays a window to input a credibility rating score for the correspondent side phone number via the user interface 13.

The controller 12 stores credibility rating information for the sender identification number inputted via the user interface 13 in the memory 14. Simultaneously, the controller 12 transmits the inputted credibility rating information for the sender identification number to other communication terminals 20 and 30.

Explained in the following description are operations conducted by the communication terminal in collecting rating information for the sender and blocking a signal of the sender.

First of all, the rating information may include a numerical value indicating a degree of 'badness' or 'goodness' of a specific user, i.e., a specific sender identification number.

Alternatively, the rating information may include a count for rating a specific sender identification number as 'badness' or 'goodness'. In other words, the rating information may correspond to a number of communication terminals rating that a reception signal for a specific sender identification number or a content of the reception signal is poor.

The communication terminal 10 collects credibility rating information rated by other communication terminals 20 and 30. For this, the transceiver 11 receives the credibility rating information for the sender identification number from each of the communication terminals 20 and 30.

So, the controller 12 accumulates the credibility rating information of a plurality of the sender identification numbers received via the transceiver 11 and the previously stored credibility rating information for the sender identification number in the memory 14. In this case, the previously stored credibility rating information for the sender identification number is the result of the rating performed on the sender by the communication terminal 10 itself.

So, the memory 14 stores the credibility rating for a plurality of the sender identification numbers. In particular, a database including the credibility rating information for each of the sender identification numbers is built in the memory 14.

In receiving signals from the communication terminals 20 and 30, the transceiver 11 checks identification numbers of them. So, the controller 12 is able to know credibility rating scores of the communication terminals 20 and 30 for a specific sender identification number.

The controller 12 counts a number of receptions of the credibility rating information from the communication terminals 20 and 30 for the specific sender identification number.

The controller 12 limits the credibility rating count conducted by each of the communication terminals 20 and 30 to several times using the counted value.

For instance, the present invention permits one credibility rating per a communication terminal for a fair rating of credibility for a specific sender. In particular, despite receiving credibility rating information for a specific sender from a specific communication terminal several times, the controller 12 applies one score among the several-times received credibility rating information.

The controller 12 sets up a blocking level for a signal reception. In this case, the blocking level is a value that defines a level of the credibility rating.

In particular, the controller 12 inquires of a user about an input of a blocking level through the user interface 13 and then sets a blocking level for a signal reception to a value designated by the user through the user interface 13.

For instance, in case that an rating score is a numerical value that indicates a degree of badness or goodness for a sender identification number, the controller 12 provides a menu, which enables a blocking level for a signal reception to be selected as one number between a minimum score 0 and a maximum score 10, through the user interface 13. If a user designates (selects or inputs) a specific value through the user interface 13, the controller 12 sets the blocking level for the signal reception to the value designated by the user.

The transceiver 11 receives credibility rating information for a sender identification number.

In case of receiving a specific signal later, the transceiver 11 confirms the sender identification number of the received signal.

The controller 12 searches the credibility rating information of the sender identification number confirmed through the transceiver 11. For instance, if the searched credibility rating score belongs to a range of a preset blocking level, the controller blocks the signal reception of the corresponding sender identification number.

The blocking of the signal reception is carried out in following manners.

1. Decoding is cut off to prevent a signal previously received via the transceiver 11 from being outputted to the user interface 13.

2. Signal received via the transceiver 11 is not received from a timing score at which a blocking is decided.

3. If an identification number confirmed by the transceiver 11 is a reception blocking target, a signal of the corresponding identification number is not received.

Meanwhile, if a signal is already received from a reception blocking target, the controller 12 stores a corresponding signal in a memory area allocated to a corresponding sender identification number. In this case, the memory area is an area in which all signals of reception blocking targets are stored. Optionally, the controller 12 deletes a signal to be blocked and stores a reception log for the deleted signal.

Figure 2:
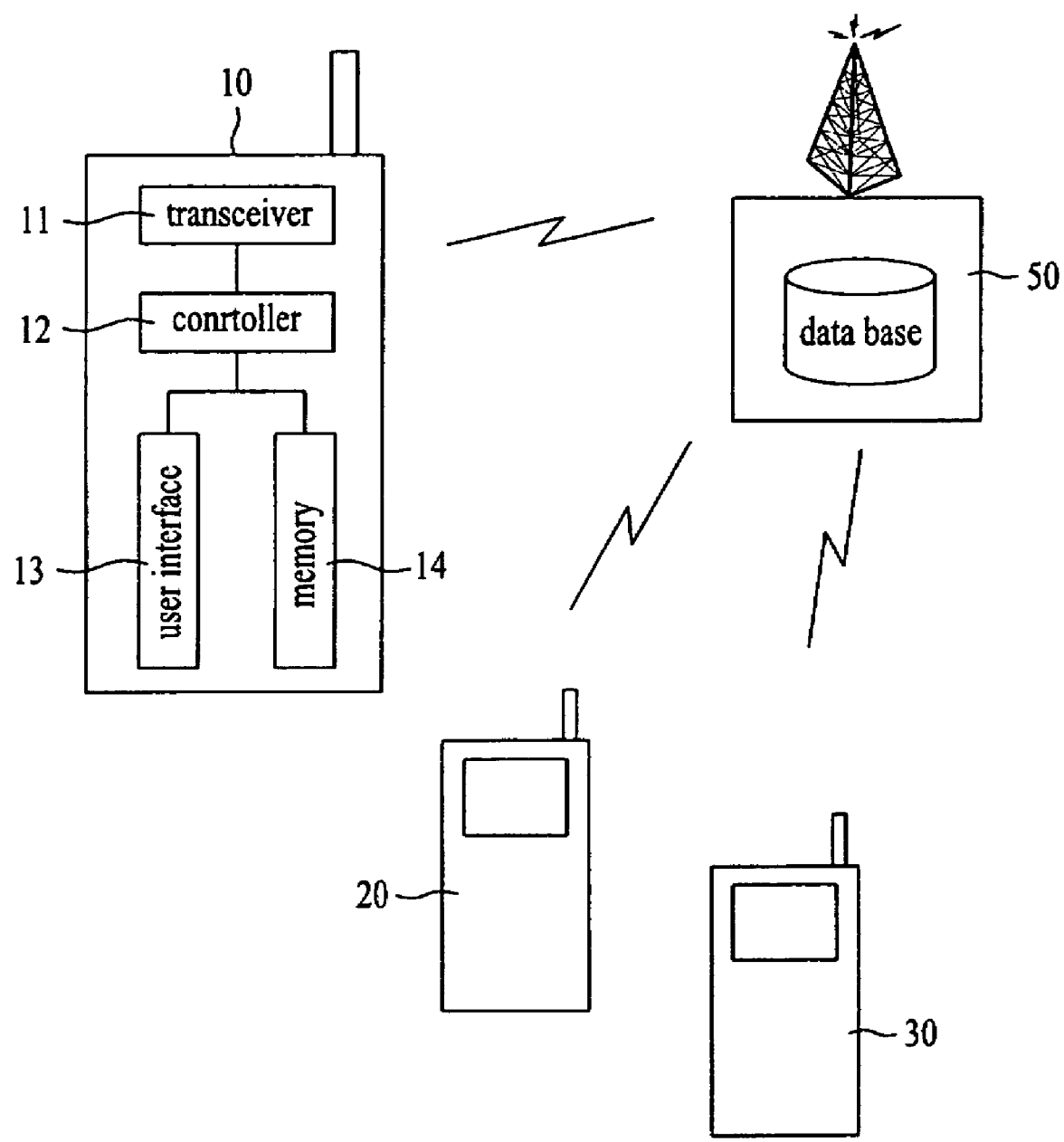
FIG. 2 is a configuration of a communication terminal for a reception blocking according to another embodiment of the present invention.

FIG. 2 is a block diagram of a configuration of a communication terminal and server for a reception blocking according to another embodiment of the present invention.

Referring to FIG. 2, a communication terminal 10 according to the present invention includes a part for rating a sender, a part for collecting rating scores of the sender and a part for blocking a signal of the sender.

In particular, the communication terminal 10 according to the present invention includes a transceiver 11, a controller 12, a user interface 13 and a memory 14.

The transceiver 11 receives signals from a plurality of senders including other communication terminals 20 and 30. In particular, the transceiver 11 analyzes a reception signal to confirm a sender identification number.

So, the communication terminal 10 receives a signal of the sender.

A server 50 is responsible for a signal relay between the communication terminal and the sender 20 or 30. And, the server 50 interoperates with the communication terminals for a signal blocking between the communication terminals.

An operation of rating a sender by the communication terminal 10 is identical to that described in FIG. 1, thereby being omitted in the following description.

The controller 12 stores credibility rating information for the sender identification number inputted via the user interface 13 in the memory 14. And, the controller 12 transmits the credibility rating information for the sender identification number to the server 50.

For instance, after a user has inputted credibility rating information for a specific sender identification number, each of the communication terminals 10, 20 and 30 immediately transmits the inputted credibility rating information to the server 50. For another instance, each of the communication terminals 10, 20 and 30 temporarily stores the inputted credibility rating information and then transmits the credibility rating information to correspond to a case that there is a signal transmission to the server 50.

The server 50 counts a number of receptions of the credibility rating information from the communication terminals 10, 20 and 30 for the specific sender identification number.

The server 50 limits the credibility rating count conducted by each of the communication terminals 10, 20 and 30 to several times using the counted value.

For instance, the present invention permits one credibility rating per a communication terminal for a fair rating of credibility for a specific sender. In particular, despite receiving credibility rating information for a specific sender from communication terminals several times, the server 50 just applies one of the several-times received credibility rating informations.

The server 50 receives credibility rating information for a sender identification number from each of the communication terminals 10, 20 and 30. So the server 50 builds a database by collecting and accumulating credibility ratings of the sender identification number.

The server 50 transmits the credibility rating information to the communication terminals 10, 20 and 30 or one of the communication terminals 10, 20 and 30.

For instance, the server 50 transmits a total value of credibility rating scores received from the communication terminals 10, 20 and 30 to the communication terminal. Alternatively, the server 50 transmits a value, which results from dividing a total of credibility rating scores received from the communication terminals 10, 20 and 30 by a number of the communication terminals having provided the credibility rating scores, to the communication terminal.

The server 50 periodically transmits the credibility rating information to the communication terminal or transmits the credibility rating information to the corresponding communication terminal to correspond to a case that there is a signal transmission to the corresponding communication terminal.

An operation of blocking a signal of a sender by the communication terminal 10 is explained as follows.

First of all, the controller 12 sets up a blocking level for a signal reception. In this case, the blocking level is a value that defines a level of the credibility rating.

Subsequently, the communication terminal 10 receives credibility rating information for a specific sender identification number.

If a score based on the received credibility rating information belongs to a range of the set blocking level, the controller 12 cuts off the signal reception of the corresponding sender identification number.

In particular, if a signal received via the transceiver 11 is a signal of a sender identification number of which reception blocking is decided, the controller 12 does not receive the corresponding signal.

For another instance, if a signal received via the transceiver 11 is a signal of a sender identification number of which reception blocking is decided, the controller 12 stores a corresponding signal in a memory area allocated to a corresponding sender identification number. In this case, the memory area is an area in which all signals of reception blocking targets are stored.

Subsequently, the controller 12 collectively deletes the signal of the memory area and stores a reception log for the deleted signal.

Various procedures in a communication terminal are explained in the following description based on the configuration shown in FIG. 2.

Figure 3:
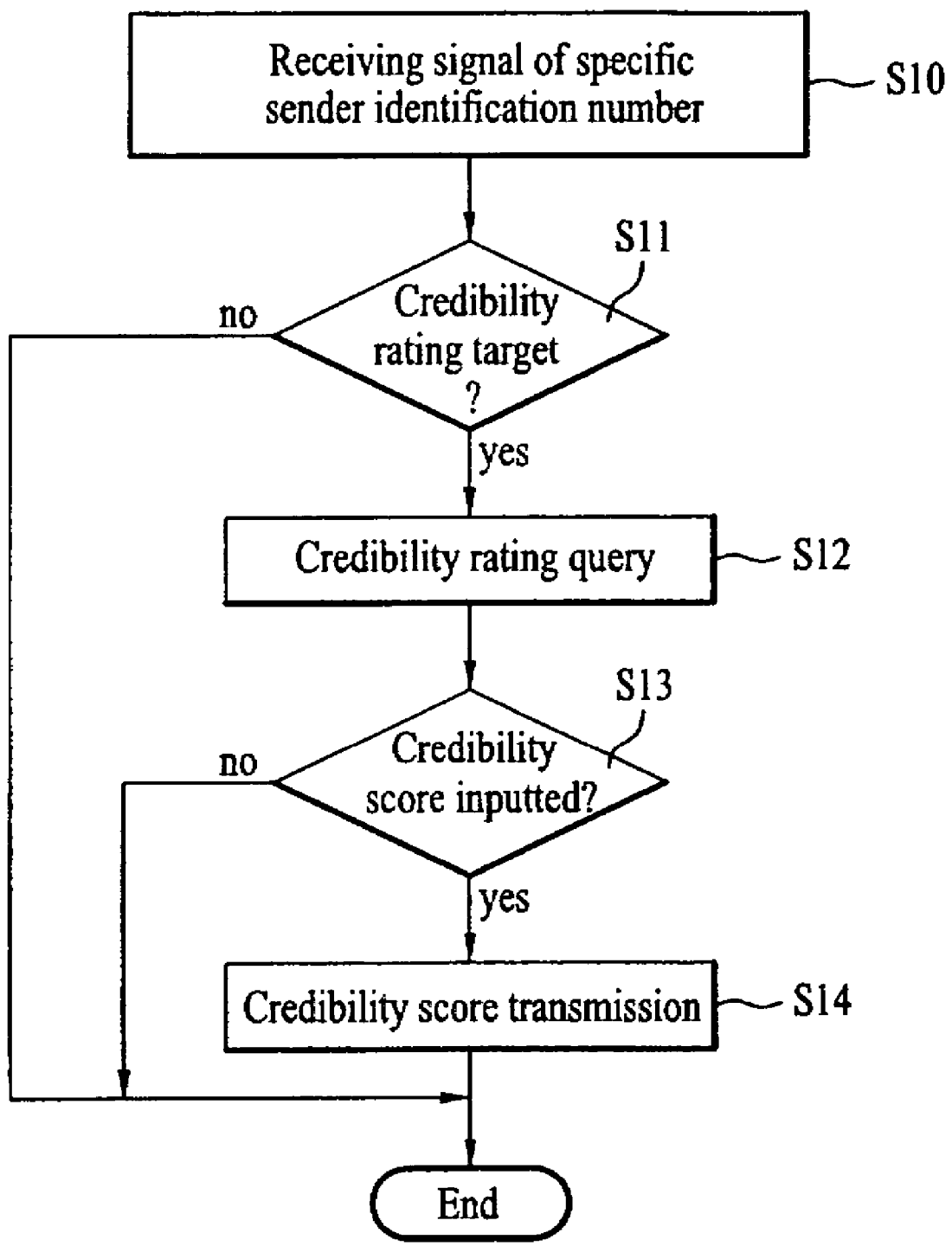
FIG. 3 is a flowchart of an rating procedure for a reception blocking in a communication terminal according to one embodiment of the present invention.

FIG. 3 is a flowchart of a rating procedure for a reception blocking in a communication terminal according to one embodiment of the present invention.

Referring to FIG. 3, a communication terminal receives a signal from a specific sender.

The communication terminal analyzes the received signal to discriminate that the received signal is transmitted from which identification number.

A server relays a signal of a sender identification number to the communication terminal. So, the communication terminal receives the signal of the sender identification number (S10).

The communication terminal confirms whether the received signal is the signal of which credibility was previously rated.

If the received signal is a target to rate credibility (S11), the communication terminal inquires of a user about a credibility rating for a sender (sender identification number) of the currently received signal (S12). For instance, the communication terminal displays an input window to input a credibility rating score for a sender identification number.

In case of a short message or e-mail, the inquiry about the credibility rating is carried out after a content of the short message or e-mail has been confirmed. In case of a voice or video communication, the inquiry is carried out after the communication has been finished.

For the example of a voice or video communication, the communication terminal 10 displays a question asking a credibility rating of a corresponding sender identification number when the corresponding communication is terminated. In this case, if a user makes an affirmative response, the communication terminal displays an input window to input a credibility score.

Meanwhile, if the user inputs a credibility rating score for a sender identification number (S13), the communication terminal 10 sends the corresponding credibility rating score to the server (S14).

Sending the credibility rating score to the server is performed at a time right after the user has been inputted the credibility rating score to the input window.

For another example, the communication terminal 10 temporarily stores the inputted credibility rating score and then sends the credibility rating score when there is a signal transmission to the server.

Meanwhile, the number of credibility rating scores for each sender identification number is preferably limited to several times. In particular, one credibility rating per a communication terminal is possible for a fair rating of credibility for a specific sender.

Explained in the following description are a procedure for collecting a credibility rating for a specific sender identification number from several communication terminals in the manner shown in FIG. 3 and a procedure for calculating a credibility rating score to be applied to a reception blocking from the collected information.

Figure 4:
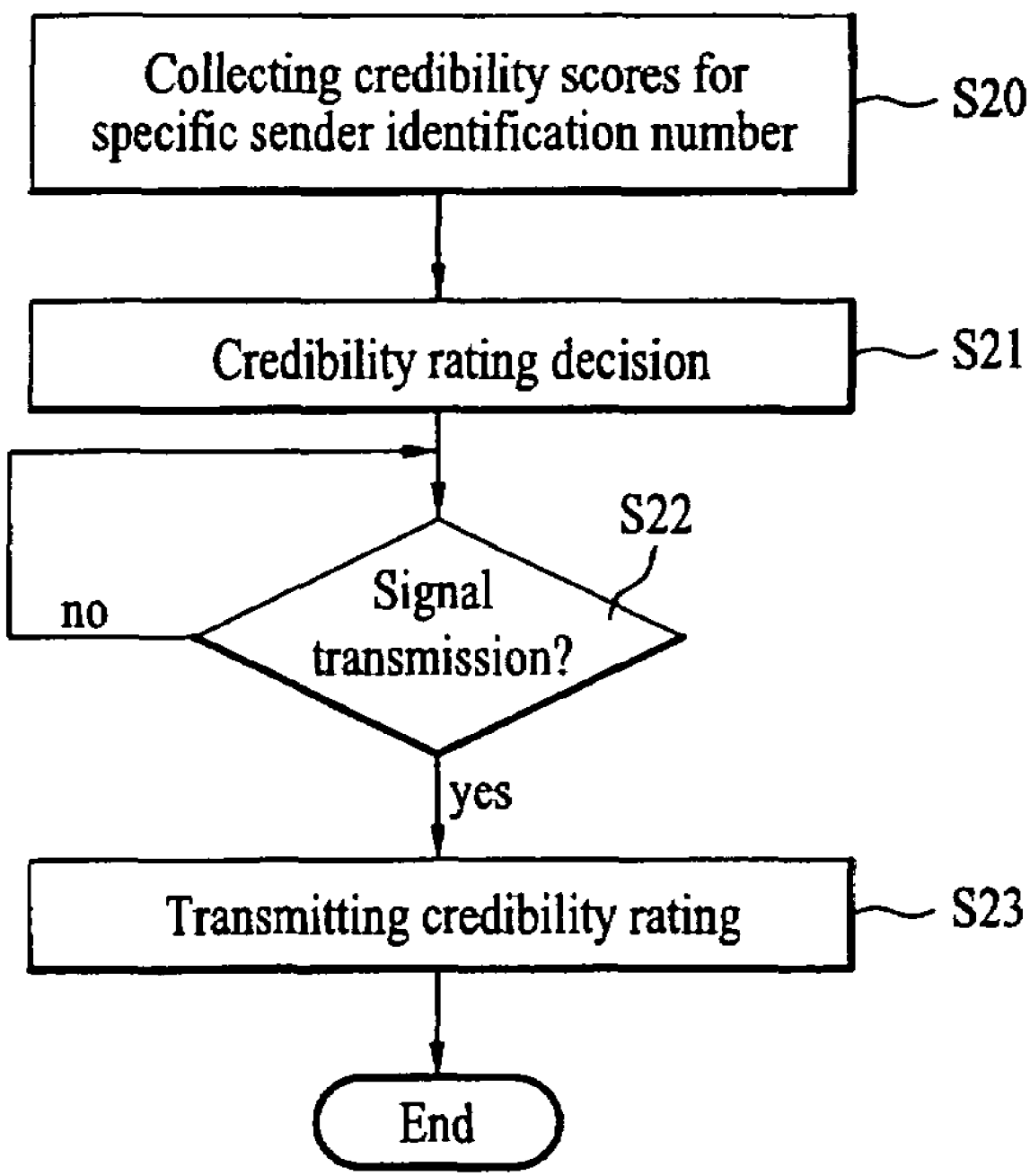
FIG. 4 is a flowchart of a procedure for providing a credibility rating for a reception blocking in a server according to one embodiment of the present invention.

FIG. 4 is a flowchart of a procedure for providing a credibility rating for a reception blocking in a server according to one embodiment of the present invention, in which a server sends credibility rating information for a specific sender in sending a signal to a communication terminal.

Referring to FIG. 4, a server offers communication services to a plurality of communication terminals located within its service area. And, FIG. 4 is explained on the assumption that one communication service is supported.

The server collects a number of credibility rating scores for a specific sender identification number from a plurality of the communication terminals (S20).

In case that the number of credibility rating scores for each sender identification number per a communication terminal is limited to several times, the server collects the credibility rating scores from a plurality of the communication terminals.

In particular, if one credibility rating per a communication is possible for a fair rating of credibility for a specific sender, the server collects only one credibility rating score from each of a plurality of the communication terminals.

Subsequently, a credibility rating for a corresponding sender identification number is calculated using the collected credibility rating scores (S21).

For instance, the credibility rating score can be the one of the following formats.

Any number between 0 and 100.

The number of times that a sender identification number is bad (for each communication terminal unit).

The number of times that a sender identification number is good (for each communication terminal unit).

The number of communication terminals that a sender identification number is bad.

The number of communication terminals that a sender identification number is good.

Meanwhile, in deciding a credibility rating for a specific sender identification number, the server considers the total score collected from a plurality of communication terminals as the credibility rating.

Alternatively, in deciding a credibility rating for a specific sender identification number, the server decides a value, which results from dividing the total score received from a plurality of communication terminals.

Subsequently, the server checks whether there is a transmission of a specific signal from a sender identification number of which credibility rating has been decided (S22).

In this case, if a specific signal is sent to a prescribed communication terminal from a corresponding sender identification number, the server sends the decided credibility rating to a communication terminal to which the signal will be sent (S23).

For another instance, the server periodically sends a credibility rating to all communication terminals provided with a communication service as targets to be provided with the credibility rating. In this case, the communication terminal compares a blocking level set for itself to the credibility rating received from the server. If a reception blocking condition is met as a result of the comparison, the communication terminal blocks a signal of a corresponding sender identification number thereafter. Besides, a detailed meaning of the signal blocking is explained in the description of FIG. 5.

A procedure for blocking a signal of a specific sender identification number in a communication terminal is explained as follows.

Figure 5:
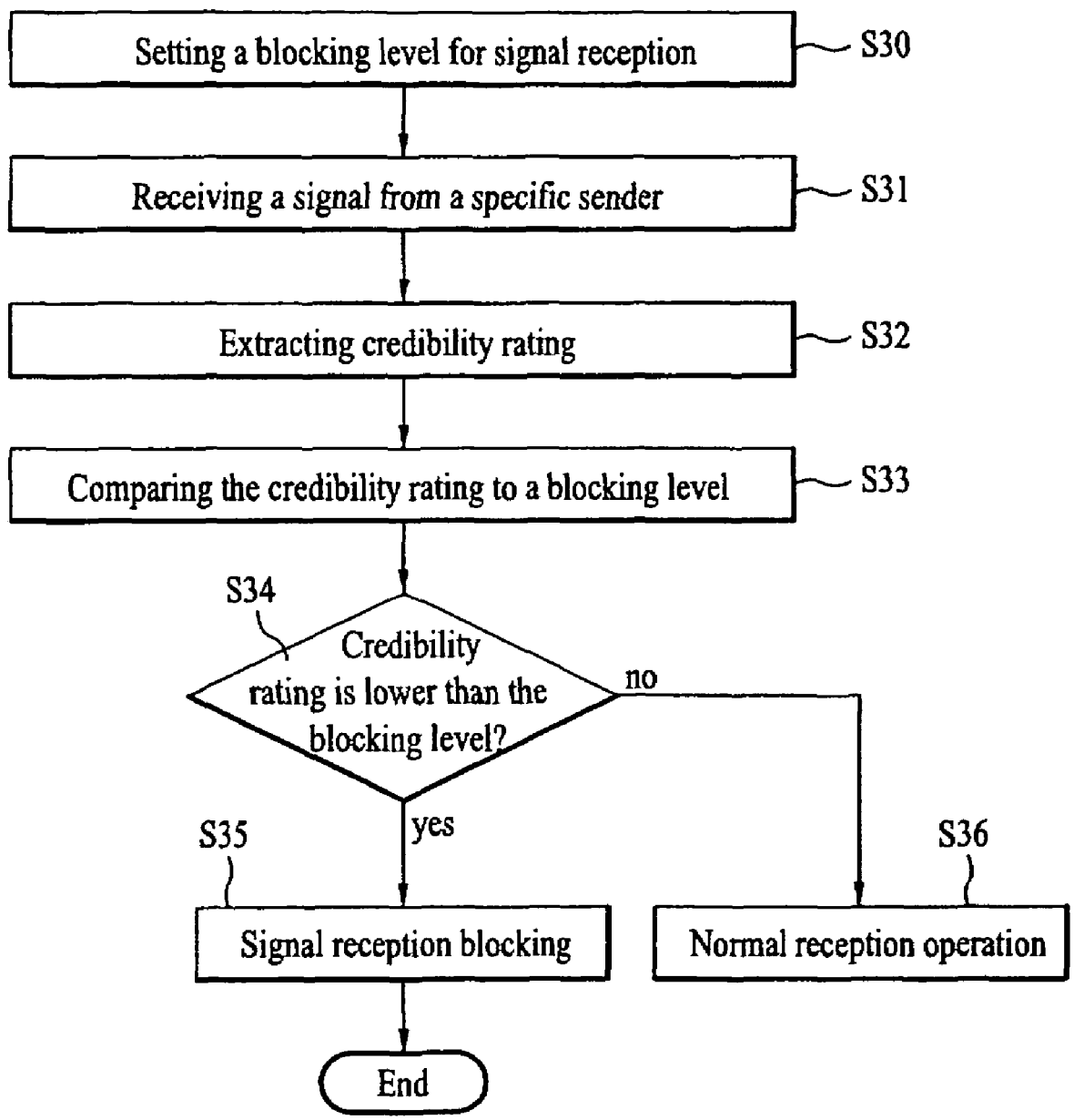
FIG. 5 is a flowchart of a reception blocking procedure in a communication terminal according to one embodiment of the present invention.

FIG. 5 is a flowchart of a reception blocking procedure in a communication terminal according to one embodiment of the present invention, in which a server transmits a reception signal by having a credibility rating included in the reception signal.

Referring to FIG. 5, a communication terminal provides an environment enabling a user to select a blocking level for a signal reception.

For instance, a communication terminal provides a menu enabling a prescribed number between a minimum 0 and a maximum 100 to be selected as a blocking level for a signal reception. So, a user designates (selects or inputs) a specific value in the menu.

If so, the communication terminal sets the blocking level for the signal reception to the value designated by the user (S30). In this case, the set blocking level is a value that determines a level of a credibility rating.

Subsequently, the communication terminal receives a signal from a specific sender (sender identification number) (S31).

In this case, the communication terminal performs a reception processing in a different way according to a type of the received signal.

1. In case of an e-mail or short message, the communication terminal temporarily stores the e-mail or short message that is received. Once a reception of the e-mail or short message is permitted, the received e-mail or short message is stored in a predetermined memory area. In this case, an e-mail or short message of which reception is blocked is stored in a separate storage area to facilitate a collective deletion. And, the separate storage area is a memory area in which blocked signals of other sender identification numbers are stored together. For another instance, it is preferable that the signal of which reception is blocked is immediately deleted. After the signal deletion, a reception history or log of the blocked signal is stored.

2. In case of deciding whether to block a voice or video communication signal, a reception call is received prior to the received voice or video communication signal. So, a communication terminal decides whether to block a signal in receiving the reception call. Subsequently, once a reception is permitted, a traffic call is established between the communication terminal and a sender. And, the voice or video communication signal is received via the traffic call.

However, the signal is not limited to an email, a short message, a voice and a video, but includes any kinds of signals that a communication terminal can receive, including broadcasting signals.

Meanwhile, after having received a signal, the communication terminal extracts a credibility rating included in the received signal (S32).

The communication terminal then compares the set blocking level to the extracted credibility rating (S33).

For instance, if the credibility rating extracted from the received signal is smaller than '78' while the blocking level is set to '78', the communication terminal blocks the signal reception. Otherwise, the communication terminal permits the signal reception.

Hence, if the credibility rating extracted from the signal for a sender identification number is lower than the set blocking level (S34), the communication terminal blocks the signal reception of the corresponding sender identification number (S35).

On the other hand, if the credibility rating extracted from the signal for a sender identification number is higher than the set blocking level, the communication terminal performs an operation of receiving the signal of the corresponding sender identification number normally (S36).

Accordingly, the present invention provides the following effects or advantages.

First of all, by sharing a result of credibility rating by a plurality of recipients for a specific sender identification number and comparing the credibility rating result to a set blocking level for a communication terminal, it is decided whether to block a specific sender signal in advance. Hence, a sender signal having bad credibility can be efficiently blocked.

Secondly, a server retains a credibility rating for a specific sender identification number and is provided periodically or in signal transmission. Hence, a communication terminal's load in processing a reception blocking can be reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of blocking a signal reception in a communication terminal, the method comprising:
   receiving, at the communication terminal, a signal transmitted from a sender with a sender identification number, the signal being associated with the sender identification number;
   displaying, in a user interface of the communication terminal, a first menu for inputting a credibility rating for the signal received from the sender identification number;
   storing, in a memory of the communication terminal, the credibility rating inputted via the first menu, wherein the memory having a plurality of credibility ratings for each of sender identification numbers including the stored credibility rating;
   displaying, in the user interface, a second menu for setting a blocking level of the signal reception;
   storing, in the memory, the blocking level set via the second menu;
   receiving, at the communication terminal, a signal transmitted from a specific sender with a specific sender identification number;
   comparing, at the communication terminal, the credibility rating corresponding to the signal received from the specific sender identification number in the memory with the blocking level that is set;
   blocking, at the communication terminal, further processing of the signal transmitted from the specific sender identification number if the credibility rating is lower than the blocking level; and
   intercepting the signal input to the user interface, if the signal from the specific sender identification number is already received.

2. The method of claim 1, wherein the signal received from the specific sender identification number comprises one selected from the group consisting of an e-mail, a short message, a voice signal and a video signal.

3. The method of claim 1, wherein the specific sender identification number comprises either an e-mail address or a sender phone number.

4. The method of claim 1, wherein if the signal from the specific sender identification number is already received, the corresponding signal is deleted at the memory and a reception log for the corresponding signal is stored at the memory.

5. The method of claim 1, further comprising:
   displaying, in the user interface, an input window to input 'goodness' or 'badness' for the sender after terminating the communication with the sender; and
   storing, in the memory, the inputted credibility rating information for the sender identification number.

6. A communication terminal, comprising:
   a transceiver configured to receive a signal transmitted from a sender with a sender identification number;
   a user interface configured to display a first menu for inputting a credibility rating for the signal received from the sender identification number and a second menu for setting a blocking level of a reception signal;
   a memory configured to store the credibility rating inputted via the first menu and the blocking level set via the second menu, wherein the memory having a plurality of credibility ratings for each of sender identification numbers including the stored credibility rating; and
   a controller configured to compare the credibility rating corresponding to the signal received from the sender identification number in the memory with the blocking level that is set, to block further processing of the signal from the sender identification number if the credibility rating is lower than the blocking level, and to intercept the signal input to the user interface, if the signal from the sender identification number is already received.

7. The communication terminal of claim 6, wherein the received signal comprises one selected from the group consisting of an e-mail, a short message, a voice signal and a video signal.

8. The communication terminal of claim 6, wherein the sender identification number comprises either an e-mail address or a sender phone number.

9. The method of claim 1, wherein the intercepting step includes:
   re-blocking a decoding of the signal if the signal is from the specific sender.

10. The communication terminal of claim 6, wherein the controller is further configured to re-block a decoding of the signal if the signal is from the specific sender.

* * * * *